(12) United States Patent
Grabon et al.

(10) Patent No.: US 7,036,330 B2
(45) Date of Patent: May 2, 2006

(54) FREE COOLING ACTIVATION OPTIMIZED CONTROLS

(75) Inventors: Michal K. Grabon, Bressolles (FR); Joseph Ballet, Bressolles (FR)

(73) Assignee: Carrier Corporation, Syracuse, NY (US)

(*) Notice: Subject to any disclaimer, the term of this patent is extended or adjusted under 35 U.S.C. 154(b) by 70 days.

(21) Appl. No.: 10/875,750

(22) Filed: Jun. 24, 2004

(65) Prior Publication Data

US 2005/0284162 A1    Dec. 29, 2005

(51) Int. Cl.
F25D 17/02    (2006.01)
F25B 25/00    (2006.01)

(52) U.S. Cl. ................. 62/201; 62/332; 62/DIG. 22

(58) Field of Classification Search ............. 62/201, 62/332, DIG. 22, 185, 96, 175, 183; 165/210
See application file for complete search history.

(56) References Cited

U.S. PATENT DOCUMENTS

| | | | | |
|---|---|---|---|---|
| 3,945,432 A | * | 3/1976 | Tamblyn | 165/210 |
| 4,271,678 A | * | 6/1981 | Liebert | 62/173 |
| 5,040,377 A | * | 8/1991 | Braun et al. | 62/183 |
| 5,797,275 A | * | 8/1998 | Forsman | 62/175 |
| 6,640,561 B1 | * | 11/2003 | Roberto | 62/96 |

* cited by examiner

*Primary Examiner*—Marc Norman
(74) *Attorney, Agent, or Firm*—Bachman & LaPointe, PC

(57) ABSTRACT

A method for optimizing free cooling activation comprising the steps of operating an air conditioning unit in a chiller mode, determining a building load, determining a free cooler maximum available capacity (FreeCapM), and activating a free cooling mode of the air conditioning unit when the free cooler maximum available capacity is greater than or equal to the building load.

6 Claims, 1 Drawing Sheet

FREE COOLING ACTIVATION OPTIMIZED CONTROLS

BACKGROUND OF THE INVENTION (1) Field of the Invention

The invention relates to a method for optimizing the point at which an air conditioning unit is switched between operating in a chiller mode to operating in a free cooling mode.

(2) Description of the Related Art

During the typical operation of air conditioning units, the air conditioning unit is run in a chiller mode wherein energy is expended to chill the air within a volume to be cooled. However, when the ambient temperature is low, there exists the possibility that such a low temperature ambient air may be utilized to provide cooling without engaging in a chiller mode. When low temperature ambient air is used by an air conditioning unit to cool a space, the unit is referred to as operating in a free cooling mode. As noted above, traditionally, even when ambient air temperature is low, the air conditioning unit is run in a chiller mode. Running in chiller mode under such conditions provides a low efficiency means of air cooling. In contrast, running the air conditioning unit under such conditions in a free cooling mode is more efficient. In the free cooling mode, one or more ventilated heat exchangers are activated and the water circulating throughout the air conditioning unit is cooled by ambient air.

Unfortunately, it is difficult to estimate the optimum outdoor temperature at which free cooling may be most effectively and efficiently utilized. This optimum point corresponds to the moment when the building load is equal to or lower than the maximum capacity of free cooler. Building load refers to the amount of energy required to be removed to keep the space, for example the interior of a building, at a constant or desired temperature. Free cooler maximum available capacity refers to the amount of energy capable of being removed by the ambient cool air. One problem arising when trying to determine the optimum outdoor temperature at which an air conditioning unit should switch from chiller mode to free cooling mode arises from the fact that free cooler capacity is directly related to outdoor air temperature while a building load may not be. Specifically, for the same outdoor temperature, the occupation of a building, as well as the heat generated internally, may significantly vary.

When free cooling is an option, it is preferable to operate in a free cooling mode, as opposed to a chiller mode, when operating a chilled water air conditioning system. Operation in a free cooling mode helps to achieve significant energy savings. In many applications, cooling is required even if the outdoor temperature is low. Operation in a free cooler mode consists of utilization of "dry cooler" (ventilated water to air heat exchanger) on the chilled water loop instead of utilizing a chiller. This arises from the fact that when outdoor temperature is lower than the water loop temperature of the system, it is possible to transfer heat from the water loop to ambient air using forced convection without the utilization of a chiller.

In traditional applications, there is set an arbitrary ambient temperature level at which a switch is performed between chiller mode and free cooler mode. When the ambient temperature reaches this arbitrarily set level, the chiller is turned off and free cooling mode is initiated. If this arbitrary temperature is not in phase with the actual needs of cooling the building, there can result an unstable operation. Specifically, there may be encountered a situation wherein there occurs rapid switching back and forth between free cooling mode and chiller mode. In addition, it may arise that cooling is performed in a non-optimum manner such as when the air conditioning unit is run in chiller mode when free cooler mode is both available and preferable.

What is therefore needed is a method for determining a point at which it is efficient to switch from chiller mode to free cooling mode in an air conditioning unit.

SUMMARY OF THE INVENTION

Accordingly, it is an object of the present invention to provide a method for optimizing the point at which an air conditioning unit is switched between operating in a chiller mode to operating in a free cooling mode.

In accordance with the present invention, a method for optimizing free cooling activation comprises the steps of operating an air conditioning unit in a chiller mode, determining a building load, determining a free cooler maximum available capacity (FreeCapM), and activating a free cooling mode of the air conditioning unit when the free cooler maximum available capacity is greater than or equal to the building load.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
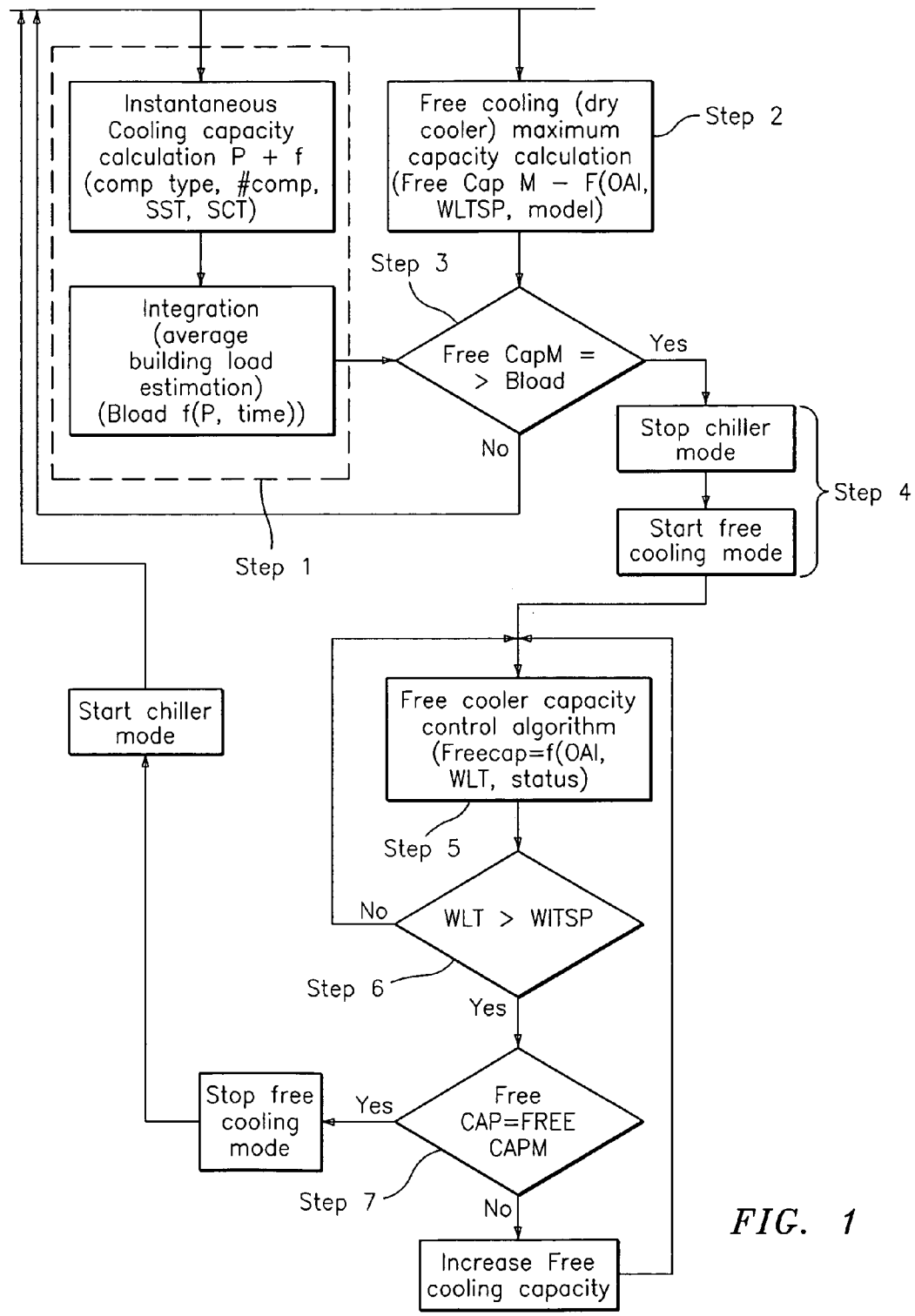
FIG. 1 is a logic diagram of the method of the present invention.

It is therefore a teaching of the present invention to provide a method for determining an optimum, or near optimum point at which an air conditioning unit should switch between operating in a chiller mode and operating in a free cooling mode. In order to do this, the present invention teaches the dynamic identification of such a switch point derived from a real time determination of both the building load and the free cooler maximum available capacity. As shall be detailed below, the method of the present invention consists of a dynamic estimation of both the building load and the free cooler maximum available capacity so as to determine an optimal point at which one should switch between a chiller mode and a free cooling mode operation.

Estimations of the building load and free cooler capacity are based on mathematical models of the chiller and dry cooler hardware and available parameters which are, for a chiller: SST (saturated suction temperature) and SCT (saturated condensing temperature) and, for a free cooler, OAT (outdoor air temperature) and WLT (water loop temperature).

In order to dynamically assess the building load, one may observe the chiller capacity. Chiller capacity, comprised of a hardware model, is an image of a building load if the leaving water temperature is stable and equal to the water loop temperature set point. In order to obtain an accurate assessment of the building load, an appropriate averaging process is required to prevent system instability as will be described more fully below. Chiller capacity may additionally be estimated using water flow, water entering, and water leaving temperatures for the air conditioning unit. However, this method requires additional hardware, such as water flow meters, and adds expense and complexity to the system. An approach making use of the SST and SCT is less expensive as it requires no additional sensors. SST and SCT are typically measured by sensors in air conditioning unit systems.

When free cooler available capacity is greater than or equal to the building load, the system of the present invention will switch from the chiller mode to a free cooler mode. Once the free cooler mode is activated, the equilibrium between the building load and free cooler capacity is obtained by adjusting free cooler capacity. The equilibrium is obtained when the free cooler leaving water temperature is equal to the water loop temperature set point. When the free cooler capacity becomes lower than the building load (i.e., the free cooler leaving water temperature is greater than the water loop temperature set point) the system of the present invention restarts the chiller so as to enter into a chiller mode and ceases to operate in free cooler mode.

With reference to FIG. 1, there is shown in detail the methodology of the present invention. As noted above, the present invention teaches the dynamic determination of a building load and compares the building load to the free cooling maximum capacity in order to determine whether or not to switch from a chiller mode to a free cooling mode. Referring to FIG. 1, it is assumed, prior to performing step 1, that the air conditioning unit is operating in a chiller mode. With respect to step 1, there is calculated the building load. As the building load is a function of the instantaneous cooling capacity, there is first, and repeatedly, calculated the instantaneous cooling capacity P. As illustrated, the instantaneous cooling capacity is calculated as a function of the number of compressors in the air conditioning unit system, the types of the compressors, the SST and the SCT. The instantaneous cooling capacity so calculated is then integrated over a period of time in order to compute a building load estimation. While the building load estimation may be integrated over any desirable period of time, it is typical to integrate it over a period of not greater than ten minutes, preferably not greater than five minutes so as to obtain an average building load estimation.

At the same time, there is calculated the free cooler maximum capacity. The free cooler maximum capacity is the maximum available free cooling capacity. The free cooler maximum capacity is calculated as a function of the outdoor air temperature, the water loop temperature set point, and the physical model of the air conditioning unit. If the physical parameters of the air conditioning unit model are known, one can combine the parameters with the outdoor air temperature as well as the water loop temperature set point of the system to dynamically calculate free cooler maximum capacity, as illustrated in step 2.

In step 3, the calculated free cooler maximum capacity is compared to the building load. If the free cooler maximum capacity is greater than or equal to the building load then it is possible to meet the building load requirements for cooling by switching to a free cooling mode. If the free cooler maximum capacity is not greater than or equal to the building load, it is not possible to switch to a free cooling mode and, as illustrated in the logic flow, the system continues to operate in chilling mode.

If, however, the free cooler maximum capacity is calculated to be greater than or equal to the building load, operation in the chiller mode is suspended and free cooling mode is begun as illustrated in step 4. Typically, operation in the free cooling mode involves the activation of a number of fans to circulate the cool outdoor ambient air in order to meet the needs of the building load. As a result, once it is determined to operate in the free cooling mode, fans are activated in a serial fashion and continued to be added until there is no need for an increase in free cooling capacity.

As shown at step 5, the instantaneous free cooler capacity is derived as a function of the outdoor air temperature, the water loop temperature of the system, and the status of the air conditioning unit system, particularly the number of fans currently operating as well as the speed of the water pump. Next, as illustrated in step 6, a determination is made as to whether or not there is a need for additional free cooling mode cooling. Specifically, the water loop temperature is compared to the water loop temperature set point. The water loop temperature set point is equivalent to the temperature desired to be obtained within the building or space to be cooled. If the water loop temperature is greater than the water loop temperature set point, there is a need for additional cooling. If, in fact, the water loop temperature (WLT) is not greater than the water loop temperature set point (WLTSP) the logic diagram indicates a return to step 5 to once again dynamically compute the free cooler capacity. If, however, in step 6, WLT is greater than WLTSP, there exists the need for more cooling and the algorithm proceeds to step 7.

In step 7, the free cooler capacity (FreeCAP) computed in step 5 is compared to the free cooling maximum capacity (FreeCapM) computed in step 2. If the FreeCAP is not equal to FreeCapM, then there exists the opportunity to increase cooling via free cooling mode which is not being efficiently utilized. As a result, free cooling capacity is increased and the algorithm returns to step 5 to recompute the free cooler capacity. Typically, the increase in free cooling capacity is achieved by activating an additional fan or increasing the speed of the water pump. If FreeCAP is equal to FreeCapM then the situation exists wherein additional cooling is required but the system is already operating to achieve maximum efficiency with regard to using ambient air temperature to cool the air conditioning unit. In this instance, it is no longer possible to meet the building load in the free cooling mode and the free cooling mode is stopped with the system entering once again into operation under the chiller mode.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for optimizing free cooling activation comprising the steps of:
    operating an air conditioning unit in a chiller mode;
    determining a building load;
    determining a free cooler maximum available capacity (FreeCapM); and
    activating a free cooling mode of said air conditioning unit when said free cooler maximum available capacity is greater than or equal to said building load.

2. The method of claim 1 wherein said determining said building load comprises the steps of:
    calculating a plurality of instantaneous cooling capacities; and
    integrating said plurality of instantaneous cooling capacities over a period of time to produce an average building load estimation.

3. The method of claim 1 wherein said activating step further comprises deactivating said chiller mode.

4. The method of claim 1 additionally comprising the steps of:
  calculating a free cooler capacity (FreeCap);
  comparing a water leaving temperature (WLT) to a water leaving temperature setpoint (WLTSP); and
  increasing free cooling capacity (FreeCAP) when WLT is greater than WLTSP and FreeCAP is not equal to FreeCapM.

5. The method of claim 1 additionally comprising the steps of:
  calculating a free cooler capacity (FreeCap);
  comparing a water leaving temperature (WLT) to a water leaving temperature setpoint (WLTSP); and
  deactivating said free cooling mode when WLT is greater than WLTSP and FreeCAP is equal to FreeCapM.

6. The method of claim 5 comprising the additional step of activating said chiller mode.

* * * * *